United States Patent
Yamagishi et al.

[15] 3,700,718
[45] Oct. 24, 1972

[54] METHOD FOR CONTINUOUS PRODUCTION OF PURE ACETONE CYANOHYDRIN

[72] Inventors: Akio Yamagishi; Hisashi Kondo; Genya Matsumoto; Shigekatsu Kondo, all of Niihama-shi, Japan

[73] Assignee: Sumitomo Chemical Company, Ltd., Osaka, Japan

[22] Filed: Nov. 24, 1969

[21] Appl. No.: 879,366

Related U.S. Application Data

[63] Continuation-in-part of Ser. No. 854,461, Sept. 2, 1969, abandoned.

[52] U.S. Cl..............................................260/465.6
[51] Int. Cl............................................C07c 121/34
[58] Field of Search..................................260/465.6

[56] References Cited

UNITED STATES PATENTS

| | | | |
|---|---|---|---|
| 2,101,823 | 12/1937 | Dittmar | 260/465.6 |
| 2,731,490 | 1/1956 | Barsky | 260/465.6 |
| 2,745,865 | 5/1956 | Journeay | 260/465.6 |

FOREIGN PATENTS OR APPLICATIONS

| | | | |
|---|---|---|---|
| 471,952 | 9/1937 | Great Britain | 260/465.6 |

*Primary Examiner*—Joseph P. Brust
*Attorney*—Stevens, Davis, Miller & Mosher

[57] ABSTRACT

Pure acetone cyanohydrin is produced continuously and economically by reacting acetone with hydrogen cyanide in the presence of an alkaline substance to produce an acetone cyanohydrin synthesis reaction mixture, acidifying the resultant reaction mixture with an acidic substance, filtering off the resultant salt from the mixture to obtain crude acetone cyanohydrin, stripping unreacted acetone and hydrogen cyanide from the crude acetone cyanohydrin with an inert gas, recovering pure acetone cyanohydrin, on the other hand, contacting the resultant inert gas containing the unreacted materials with the above-mentioned acetone cyanohydrin synthesis reaction mixture to absorb the unreacted materials into the reaction mixture, and then recycling the inert gas for next stripping.

6 Claims, 1 Drawing Figure

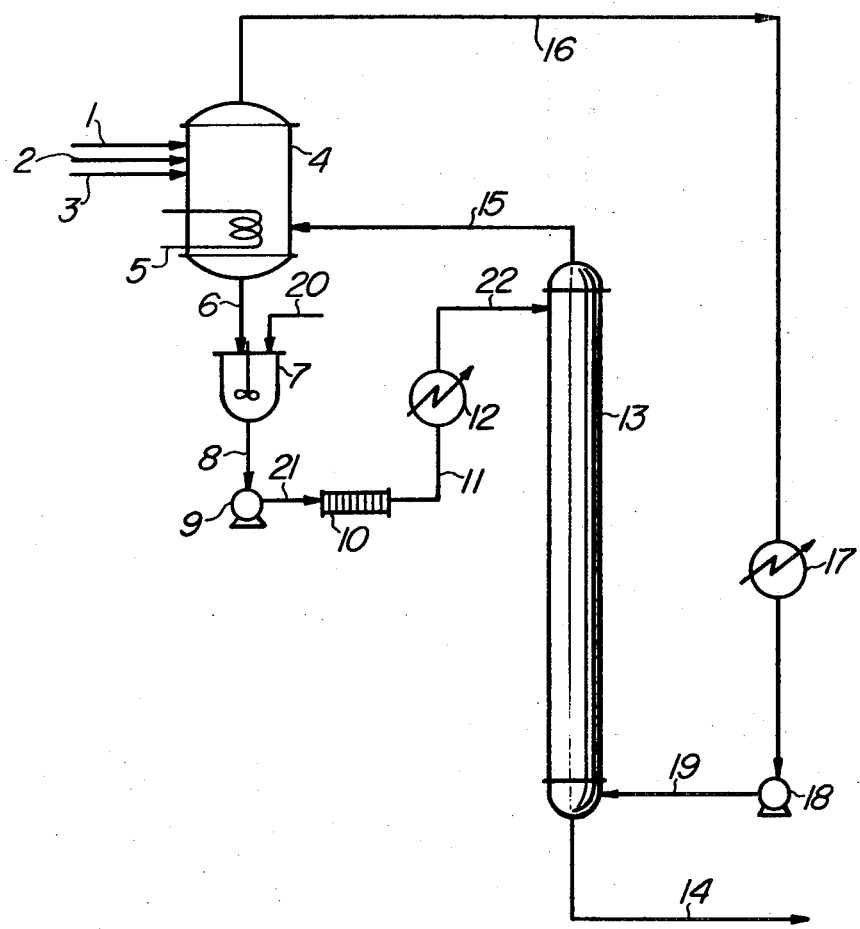

METHOD FOR CONTINUOUS PRODUCTION OF PURE ACETONE CYANOHYDRIN

CROSS-REFERENCE TO OTHER APPLICATION

This is continuation-in-part of application Ser. No. 854,461 filed Sept. 2, 1969 and now abandoned.

The present invention relates to a method for the production of acetone cyanohydrin which is a raw material for the production of methyl methacrylate. More particularly, it relates to a method for the continuous production of the same having a high purity.

It has been well known that acetone cyanohydrin is formed by the reaction of acetone and hydrogen cyanide, as shown by the following reaction equation:

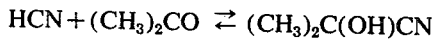

$$HCN + (CH_3)_2CO \rightleftarrows (CH_3)_2C(OH)CN$$

The reaction is reversible and the lower the reaction temperature is, the more the product is formed. In the reaction, a small amount of an alkaline substance acts as a catalyst and increases considerably the reaction rate.

Heretofore, acetone cyanohydrin has been produced industrially by reacting acetone and hydrogen cyanide in the presence of a catalytic amount of an alkaline substance at a low temperature of −20° − +20° C., stabilizing the formed acetone cyanohydrin with an acidic substance, filtering off the formed salt of the catalyst from the reaction mixture to obtain crude acetone cyanohydrin, and then purifying the crude product.

In the known process, the crude acetone cyanohydrin is purified by distillation at a temperature of 80° − 140° C under a reduced pressure of 20 − 200 mmHg, while removing unreacted hydrogen cyanide and acetone as a distillate and recycling the distillate to the acetone cyanohydrin-synthesizing system (refer to Japanese Pat. Publication 5755/'60). However, this purification method is accompanied with various difficulties such as, for example, decomposition of the formed acetone cyanohydrin in the distillation column, considerable material loss during the distillation, requirement of apparatus for recovering toxic materials such as hydrogen cyanide or acetone cyanohydrin, etc.

On the other hand, it has been known that the crude acetone cyanohydrin is purified by stripping unreacted materials with an inert gas (refer to U. S. Pat. No. 2,731,490 and Japanese Pat. Publication 11,965/'61). In such a method, the unreacted materials are stripped by blowing an inert gas into the crude acetone cyanohydrin, and absorbed into acetone, water or an aqueous alkaline solution by contacting the inert gas accompanying the unreacted materials with a liquid as such, and then the inert gas is drawn off. In this method, however, it is difficult to recover the unreacted materials since they are absorbed in the liquid in very low concentration, and toxic hydrogen cyanide is drawn off together with the inert gas. In addition, the recycle of a considerably large amount of the aqueous solution containing the unreacted materials to the reaction system results in lowering the purity of the product, acetone cyanohydrin, whereby the subsequent use of the product is restricted. For this reason, the stripping method has hardly been employed, and the art has insisted on the above-mentioned distilling method, for purifying the crude acetone cyanohydrin.

The present inventors have paid their attention to the stripping method and to overcoming the drawbacks, and found that acetone cyanohydrin is produced advantageously in view of economical commerce by employment of an improved stripping method.

An object of the present invention is to provide a process for purifying crude acetone cyanohydrin without such difficulties as the decomposition thereof.

Another object of the present invention is to provide a method for the continuous production of high purity acetone cyanohydrin in good yield with complete recovery of unreacted acetone and hydrogen cyanide without any discharge thereof.

Other objects and merits of the present invention will be apparent from the following description.

According to the present invention, crude acetone cyanohydrin is purified by being contacted with an inert gas in a stripping zone to strip unreacted acetone and unreacted hydrogen cyanide, recovering pure acetone cyanohydrin from the stripping zone, on the other hand contacting the obtained gaseous mixture containing the inert gas, stripped, unreacted acetone, and unreacted hydrogen cyanide with acetone cyanohydrin synthesis reaction mixture containing 90 − 97 wt percent of acetone cyanohydrin, 1 − 3 wt percent of hydrogen cyanide, 2 − 7 wt percent of acetone and 0.01 − 7 wt percent of alkaline catalyst at a temperature of −20° C − +20° C to absorb the unreacted acetone and unreacted hydrogen cyanide into the acetone cyanohydrin synthesis reaction mixture, and recycling the drawn off inert gas for the stripping.

Further, according to the present invention, pure acetone cyanohydrin can be produced continuously and economically by employment of such purification method.

The words "acetone cyanohydrin synthesis reaction mixture" used in the specification and claims mean a reaction mixture which is obtained from the reaction of acetone and hydrogen cyanide each in about equimolar amount in the presence of an alkaline substance at a temperature of −20° C to 20° C for 10 to 200 minutes which is almost sufficient to establish the chemical equilibrium and contains 90 to 97 percent by weight of acetone cyanohydrin, 1 to 3 percent by weight of hydrogen cyanide and 2 to 7 percent by weight of acetone as well as 0.01 to 7 percent by weight of an alkaline catalyst. And, in case the alkaline catalyst is used in the form of an aqueous solution, 5 or less percent by weight of water is contained in the acetone cyanohydrin synthesis reaction mixture. The words "crude acetone cyanohydrin" used herein mean a composition mainly comprising acetone cyanohydrin which is obtained by acidifying the acetone cyanohydrin synthesis reaction mixture to pH 1 − 4 and removing the formed salt of catalyst therefrom.

The gist of the present invention resides briefly in contacting the stripping gas containing unreacted acetone and hydrogen cyanide with a specific composition of acetone cyanohydrin synthesis reaction mixture, and recycling the stripping gas in a closed system.

In the present invention, the alkaline substance and the acid may be those which are employed in the known processes for the production of acetone cyanohydrin, examples of which include such inorganic bases as sodium hydroxide and potassium hydroxide, organic bases, and sulfuric acid and acetic acid.

The stripping treatment of crude acetone cyanohydrin according to the present invention is preferably carried out by contacting the crude acetone cyanohydrin with an inert gas at a temperature of 40° to 160° C, preferably 80° to 120° C, under reduced or atmospheric pressure in a stripping column which is suitable for taking short residence time. In such treatment, the hydrogen cyanide and acetone contained in the crude acetone cyanohydrin can be transferred to the gas phase and leave the column, while acetone cyanohydrin is not subjected to decomposition because of the short residence time, and is recovered without containing substantial amounts of hydrogen cyanide and acetone.

The inert gas used, for example, includes nitrogen, hydrogen and gaseous hydrocarbons among which nitrogen is usually used. Air may be used, but in this case it should be necessary to pay attention so as not to yield a gas mixture of explosion composition. In any event, any gas capable of stripping the unreacted materials may be used unless it influences adversely any of the components present. The amount of the inert gas introduced into the crude acetone cyanohydrin is, for example, 0.01 – 10 N m³ per 1 Kg of the crude acetone cyanohydrin.

The column used for the stripping may be one capable of shortening the residence time, such as a wetted-wall tower or a packed tower. The suitable residence time is for example from 1 second to 10 minutes.

The gaseous mixture derived from the stripping zone which contains an inert gas, stripped, unreacted hydrogen cyanide and acetone is introduced into the reacting zone for preparing acetone cyanohydrin and contacted with the acetone cyanohydrin synthesis reaction mixture at a temperature of −20° C to 20° C. In the present invention, the unreacted materials contained in the acetone cyanohydrin synthesis reaction mixture are not stripped by the introduced inert gas, but on the contrary, the hydrogen cyanide and acetone present in the inert gas are absorbed in the reaction mixture. Accordingly, the specific absorbing liquid such as water is not necessary in the present invention, and the lowering of the purity of acetone cyanohydrin by use of such an absorbing agent is avoidable according to the present invention. The specific temperature used in the absorbing step has been decided on the ground of the vapor-liquid equilibrium data measured by experiment of the inventors. At a temperature of above 20° C, the amount of hydrogen cyanide which is not absorbed and remains in the inert gas becomes extraordinarily large, and it is necessary to elect the temperature below 20° C in order to absorb hydrogen cyanide in the inert gas into the acetone cyanohydrin synthesis reaction mixture. The absorbing effect may be increased as the temperature decreases, but the selection of the temperature below −20° C naturally results in considerable disadvantage from the economical viewpoint. Thus, the temperature of −20° to 20° C to be used has been concluded. Contact time of the gaseous mixture with the acetone cyanohydrin synthesis reaction mixture is, for example, 1 second – 1 minute.

The inert gas leaving the acetone cyanohydrin synthesis reaction mixture contains smaller amounts of hydrogen cyanide and acetone, and is recycled to the stripping step for reuse. As the result, according to the present invention, all the materials used in the course of the process are not discharged from the system, and the ultimate yield of the product is considerably increased due to the almost complete utilization of unreacted acetone and hydrogen cyanide. Thus, the yield of acetone cyanohydrin in the present invention is as high as 97 to 99 percent based on hydrogen cyanide and 98 to 99 percent based on acetone, as compared with that of 95 percent based on hydrogen cyanide in the method described in Japanese Pat. Application No. 11,965/'61.

The additional advantage of the present invention lies in no necessitation of the apparatus for preventing the discharge of toxics such as hydrogen cyanide and acetone cyanohydrin, due to recycling the inert gas containing such compound in a closed system.

The accompanying drawing shows an example of the systematic flow sheet suitable for carrying out the process of the present invention.

The present invention is more particularly explained by referring to the drawing. The starting materials, hydrogen cyanide and acetone, as well as the catalyst solution containing alkaline substance, are introduced through the introducing lines 1, 2 and 3, respectively, into the acetone cyanohydrin synthesis reacting zone 4 which is kept at a temperature of −° to 20° C by means of cooling medium running through cooling coil 5. The reaction mixture is introduced to neutralizing zone 7 after the reaction equilibrium is established. The reaction mixture is neutralized and acidified to pH 1 to 4 in the neutralizing zone 7 by supplying an acidic material through line 20, and introduced into filtering zone 10 through line 8, pump 9 and line 21 and filtered to remove the alkali salt of the acid. The filtrate is introduced through line 11 to heat exchanging zone 12 where the filtrate is heated to a desired temperature, and introduced into stripping zone 13 through line 22. The stripping zone may be provided with a heat exchanger therein if necessary, for example, when temperature of the filtrate, that is, the crude acetone cyanohydrin, is undesirably lowered. On the other hand, the recycling inert gas is introduced into the stripping zone at the bottom through line 19, and contacted with the crude acetone cyanohydrin flowing downward at a temperature of 40° to 160° C to subject hydrogen cyanide and acetone in the acetone cyanohydrin to stripping and obtain pure acetone cyanohydrin which is drawn off from the bottom of the stripping zone through line 14. The stripped hydrogen cyanide and acetone are introduced into the reacting zone 4 together with the inert gas through line 15 and allowed to contact with the acetone cyanohydrin synthesis reaction mixture therein at a temperature of −20° to 20° C. The absorption occurs instanteneously due to the low temperature of the mixture, and the inert gas resulting from the absorption of the unreacted materials is drawn off through line 16 from the reaction zone 4. The gas leaving the reaction zone contains 0.5 to 5 percent by volume of hydrogen cyanide and 0.05 to 0.5 percent by volume of acetone depending on the absorption conditions, and it is heated to a desirable temperature by passing through heat exchanging zone 17 and pressurized by means of gas blower 18, and supplied again to the stripping zone 13 through line 19.

The present invention will be illustrated by the following Example which is, however, not construed to limit the invention defined in the attaching claims. The percent referred therein is by weight, and equipments are explained by referring to the symbols of drawing.

EXAMPLE

To a stainless steel reactor 4, 4.3 Kg/hour of liquid hydrogen cyanide, 9.2 Kg/hour of acetone and 0.10 Kg/hour of 25 percent aqueous solution of caustic soda, are charged continuously through the lines 1, 2 and 3, respectively, and allowed to react with cooling at 0° C by means of the cooling coil 5 through which a cooling medium is passed. The reaction mixture is drawn from the reactor through line 6 and introduced into the neutralizing tank 7 where 0.024 Kg/hour of 98 percent sulfuric acid is supplied through the line 20 to neutralize the reaction mixture, and the neutralized reaction mixture is filtered by means of the filter 10 to remove the resulting sodium sulfate. The filtrate is heated to 100° C at the heat exchanger 12 and is supplied to the stripper column 13. The filtrate, that is, crude acetone cyanohydrin, contains 95.2 percent of acetone cyanohydrin, 1.5 percent of hydrogen cyanide, 4 percent of acetone and 2 percent of water. The stripper 13 is in the form of wetted-wall tower where the crude acetone cyanohydrin is maintained at a temperature of 90° to 100° C by means of heating steam. On the other hand, 1.5 N m³/hour of nitrogen is supplied as an inert gas to the stripper from bottom thereof. The unreacted hydrogen cyanide and acetone contained in the crude acetone cyanohydrin is subjected to stripping in the stripper and introduced into the reactor 4 through line 15, and is absorbed into the acetone cyanohydrin synthesis reaction mixture. The gas drawn from the reactor consists of 4 percent by volume of hydrogen cyanide, 0.2 percent by volume of acetone, 0.1 percent by volume of water and 95 percent by volume of nitrogen, and is drawn off through line 16 and supplied again to the stripper 13 through heat exchanger 17, blower 18 and line 19.

The acetone cyanohydrin drawn off from the bottom of stripper 13 amounts to 13.5 Kg/hour, and consists of 98.6 percent of acetone cyanohydrin, 0.1 percent of hydrogen cyanide, 0.4 percent of acetone and 0.9 percent of water. Thus, the yield of the product is calculated as 98.6 percent for hydrogen cyanide and 99.0 percent of acetone.

It will be appreciated that the purity of the product becomes higher as the circulating volume of the inert gas is increased.

As in the foregoing description, acetone cyanohydrin having a high purity can be produced with an advantage in view of commerce according to the present invention, with solving the problem of air pollution by discharge of the toxics such as hydrogen cyanide and acetone cyanohydrin.

What we claim is:

1. A method for purifying acetone cyanohydrin comprising contacting crude acetone cyanohydrin resulting from the reaction of acetone and hydrogen cyanide in the presence of an alkaline catalyst followed by acidification and removal of the resulting catalyst salt
with inert gas,
at a temperature of from 40° to 160° C for a period of from 1 second to 10 minutes,
in a stripping zone to strip unreacted acetone and unreacted hydrogen cyanide therefrom,
recovering pure acetone cyanohydrin,
contacting the gaseous mixture obtained from said stripping zone containing said inert gas, said unreacted acetone, and said unreacted hydrogen cyanide
with an acetone cyanohydrin synthesis reaction mixture containing 90–97 wt percent acetone cyanohydrin, 1–3 wt percent hydrogen cyanide, 2–7 wt percent acetone, and 0.01–7 wt percent of an alkaline catalyst.
at a temperature of −20° C to +20° C,
in an acetone cyanohydrin synthesis reaction zone to absorb the unreacted acetone and unreacted hydrogen cyanide into said acetone cyanohydrin synthesis reaction mixture, and
drawing off said inert gas for recycling to said stripping zone.

2. A method according to claim 1, wherein the inert gas is nitrogen.

3. A method according to claim 1, wherein the contact of the crude acetone cyanohydrin with the inert gas is carried out at a temperature of 80° C – 120° C.

4. A method according to claim 1, wherein the amount of the inert gas contacted with the crude acetone cyanohydrin is 0.01 – 10 N m³ per 1 Kg of the crude acetone cyanohydrin.

5. A method according to claim 1, wherein the gaseous mixture containing the inert gas, unreacted acetone and unreacted hydrogen cyanide is contacted with the acetone cyanohydrin synthesis reaction mixture for a period of from 1 second to 1 minute.

6. A method for the continuous production of acetone cyanohydrin, which comprises the following steps:

1. contacting acetone with hydrogen cyanide in an approximately equimolar amount in the presence of an alkaline substance at a temperature of −20° C – +20° C in a reaction zone, to produce an acetone cyanohydrin synthesis reaction mixture,
2. adding an acidic substance into the acetone cyanohydrin synthesis reaction mixture obtained in the step (1) to acidify the mixture to pH 1 – 4 forming an insoluble salt of the alkaline substance,
3. separating the salt of the alkaline substance formed in the step (2) from the mixture by filtration to obtain crude acetone cyanohydrin containing acetone cyanohydrin, as main component, and unreacted acetone and hydrogen cyanide as impurities,
4. introducing the crude acetone cyanohydrin in the step (3) into a stripping zone,
5. contacting the crude acetone cyanohydrin of the step (4) with an inert gas at a temperature of from 40' to 160° C for a period of from 1 second to 10 minutes in the stripping zone to strip the unreacted acetone and unreacted hydrogen cyanide from the crude acetone cyanohydrin,
6. recovering the pure acetone cyanohydrin obtained in the step (5) from the stripping zone,
7. introducing the gaseous mixture obtained in the step (5) and containing the inert gas, unreacted acetone and unreacted hydrogen cyanide from the stripping zone into the acetone cyanohydrin synthesis reacting zone of the step (1),
8. contacting the gaseous mixture of the step (7) with the acetone cyanohydrin synthesis reaction mixture containing 90 – 97 wt percent of acetone cyanohydrin, 1 – 3 wt percent of hydrogen cyanide, 2 – 7 wt percent of acetone and 0.01 – 7 wt percent of an alkaline catalyst at a temperature of −20° C – +20° C to absorb the unreacted acetone and the unreacted hydrogen cyanide in the gaseous mixture into the acetone cyanohydrin synthesis reaction mixture, and
9. recycling the inert gas from the step (8) into the stripping zone of the step (5).

* * * * *